(12) United States Patent
    Seller

(10) Patent No.: US 11,245,434 B2
(45) Date of Patent: Feb. 8, 2022

(54) LOW POWER LONG-RANGE RADIO

(71) Applicant: Semtech Corporation, Camarillo, CA (US)

(72) Inventor: Olivier Bernard André Seller, Sainte-Soulle (FR)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 17/114,619

(22) Filed: Dec. 8, 2020

(65) Prior Publication Data

US 2021/0184724 A1 Jun. 17, 2021

(30) Foreign Application Priority Data

Dec. 11, 2019 (EP) .................................... 19215072

(51) Int. Cl.
*H04B 1/02* (2006.01)
*H04B 1/69* (2011.01)
*H04L 7/04* (2006.01)
*H04L 7/08* (2006.01)

(52) U.S. Cl.
CPC .............. *H04B 1/69* (2013.01); *H04L 7/048* (2013.01); *H04L 7/08* (2013.01); *H04B 2001/6912* (2013.01)

(58) Field of Classification Search
CPC .............. H04B 1/69; H04L 7/048; H04L 7/08
See application file for complete search history.

(56) References Cited

U.S. PATENT DOCUMENTS

| 6,940,893 B1 * | 9/2005 | Pinkney ................... H04B 1/69 370/307 |
| 7,430,257 B1 * | 9/2008 | Shattil ..................... H04B 1/707 342/367 |
| 8,406,275 B2 | 3/2013 | Sforza |
| 2014/0362891 A1 * | 12/2014 | Hiscock ................ H04L 27/103 375/139 |

FOREIGN PATENT DOCUMENTS

| EP | 2278724 A1 * | 1/2011 | ............... H04B 1/69 |
| EP | 2449690 A1 | 5/2012 | |
| EP | 2763321 A1 | 8/2014 | |
| EP | 3264622 A1 | 1/2018 | |
| EP | 3836409 A1 * | 6/2021 | ........... H04L 27/103 |
| WO | WO-2020260177 A1 * | 12/2020 | ........... H04L 27/103 |

OTHER PUBLICATIONS

Qicai et al.,"A New Chip-level Differential Detection System for DS-CDMA" IEEE, 2002, pp. 544-547.*

(Continued)

*Primary Examiner* — Tesfaldet Bocure
(74) *Attorney, Agent, or Firm* — Blank Rome LLP

(57) ABSTRACT

Advanced modulation and demodulation schemes for LoRa or equivalent chirp spread spectrum transmissions, with differential modulation and symbol repetition improve the sensitivity in combination with soft demodulation methods.

12 Claims, 3 Drawing Sheets

(56) References Cited

OTHER PUBLICATIONS

"Information Technology—Telecommunications and Information Exchange Between Systems—Local and Metropolitan Area Networks—Specific Requirements—Part 15-4: Wireless Medium Access Control (MAC) and Physical Layer (PHY) Specifications for Low-Rate Wireless Personal Area Networks (WPANs)"; International Standard, ISO/IEC/IEEE, Second Edition, Mar. 2018, 712 pgs.

H. Mroue, et al., "Analytical and Simulation Study for LoRa Modulation", IEEE, 2018, 5 pgs.

P. I. Puzyrev, et al., "Frequency Shift Chirp Modulation with Additional Differential Phase Shift Keying", $20^{th}$ International Conference on Micro/Nanotechnologies and Electron Devices EDM, 2019, 5 pgs.

\* cited by examiner

| D | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| B | 0000 | N/A | N/A | N/A | 0001 | N/A | N/A | N/A | 0010 | N/A | N/A | N/A | 0011 | N/A | N/A | N/A |

| D | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $B_h$ | 0000 | 0000 | N/A | N/A | 0001 | 0001 | N/A | N/A | 0010 | 0010 | N/A | N/A | 0011 | 0011 | N/A | N/A |
| $B_l$ | 0 | 1 | N/A | N/A | 0 | 1 | N/A | N/A | 0 | 1 | N/A | N/A | 0 | 1 | N/A | N/A |

LOW POWER LONG-RANGE RADIO

REFERENCE DATA

The present application claims priority from European patent application EP19215072.0 of Dec. 11, 2019, the content whereof are hereby incorporated in their entirety.

FIELD OF THE INVENTION

The present invention concerns, in embodiments, Long range low power radio transmitters and receivers, such as radio transmitters and receivers for digitally synthesized chirp spread-spectrum signals.

DESCRIPTION OF RELATED ART

European patent application EP2449690 describes a communication system using digitally-synthesized chirp symbols as modulation, and a suitable FFT based receiver.

European patent application EP2763321 describes, among others, one such modulation method in which the phase of the signal is essentially contiguous, and the chirps are embedded in data frames in such a way as to allow synchronization between the transmitter and receiver nodes, as well as determining the propagation range between them. This modulation scheme is used in the long-range LoRa™ RF technology of Semtech Corporation and will be referred simply as 'LoRa' in the following of this document.

EP3264622 discloses a low-complexity LoRa receiver suitable for Internet-of-thing applications.

LoRa modulation can tolerate a high error rate, as long as they are static or slowly drifting. Rapid changes of the frequency error, however, can lead to synchronization issues that eventually lead to demodulation errors. The present invention provides an enhanced modulator that can overcome this shortcoming.

BRIEF SUMMARY OF THE INVENTION

According to the invention, these aims are achieved by means of the object of the appended claims. In particular, these aims are achieved by a A low-power long-range radio device having a transmitting section, comprising: an encoder operatively arranged for encoding a digital message into symbols having a plurality of bits; a modulator receiving the symbols, arranged for synthesizing a series of modulated chirps whose instantaneous frequency vary according to one of a plurality of functions that are cyclical shift of one base chirp function, wherein the cyclical shift of a chirp represents the value of a corresponding symbol; including a differential coding unit receiving as input a series of symbols generated by the encoder and generating a series of differential-encoded symbols as output, whereby each possible value of the input symbol corresponds to a predetermined change in the series of differential-encoded symbols.

Dependent claims introduce other technical features that, although advantageous, are not essential like: the processing of the digital message is processed by an interleaver, a Gray encoder, and by the differential coding unit; selective disabling of the differential coding unit can be selectively disabled, possibly with part of each frame, such as the detection and synchronisation parts of each frame, not processed by the differential coding unit; a receiving section comprising a de-chirping unit for acquiring the cyclical shift of received chirp signals followed by a soft differential decoder; symbol repetition arranged to replace an input symbol with a predetermined number of symbols derived from the input symbol by a predetermined succession of cyclical shifts, which can include the zero shift.

An independent aspect of the invention concerns a low-power long-range radio device having a transmitting section, comprising: an encoder operatively arranged for encoding a digital message into symbols having a plurality of bits; a modulator receiving the symbols, arranged for synthesizing a series of modulated chirps whose instantaneous frequency vary according to one of a plurality of functions that are cyclical shift of one base chirp function, wherein the cyclical shift of a chirp represents the value of a corresponding symbol; including a symbol repetition unit operatively arranged to replace an input symbol with a predetermined number of symbols derived from the input symbol by a predetermined succession of cyclical shifts, which can include the zero shift.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
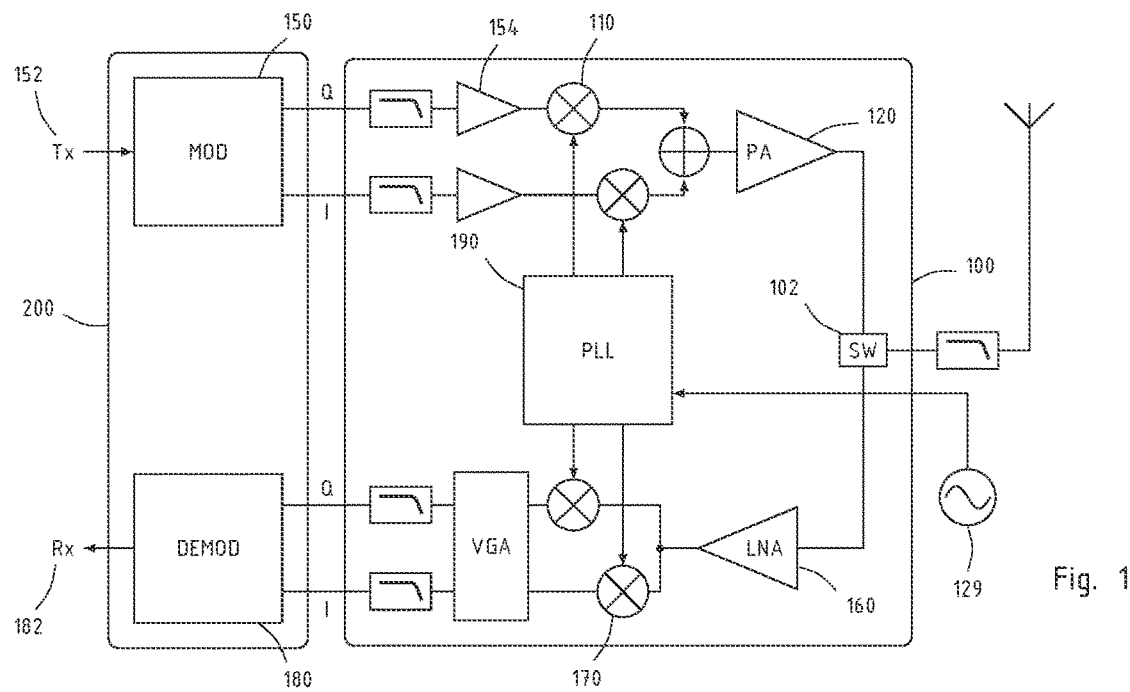
FIG. 1 shows, in schematic simplified fashion, the structure of a radio modem according to one aspect of the present invention.

Several aspects of the chirp modulation technique employed in the present invention are described in European Patent EP3264622 and will be reminded here summarily. The radio transceiver that is schematically represented in FIG. 1 is a possible embodiment of the invention. The transceiver includes a baseband section 200 and a radiofrequency section 100. The transmitter includes a baseband modulator 150 that generates a baseband complex signal based on the digital data 152 at its input. This is then converted to the desired transmission frequency by the RF section 100, amplified by the power amplifier 120, and transmitted by the antenna 154 is a buffer and a PLL 190 generate a local oscillation signal.

Once the signal is received on the other end of the radio link, it is processed by the receiving part of the transceiver of FIG. 1 that comprises a low noise amplifier 160 followed to a down-conversion stage 170 that generates a baseband signal (which is again a complex signal represented, for example by two components I, Q) comprising a series of chirps, then treated by the baseband processor 180, whose function is the reverse of that of the modulator 150, and provides a reconstructed digital signal 182.

The signal to be processed comprises a series of chirps whose frequency changes, along a predetermined time interval, from an initial instantaneous value $f_0$ to a final instantaneous frequency $f_1$. It will be assumed, to simplify the description, that all the chirps have the same duration T, although this is not an absolute requirement for the invention.

Figure 2A:
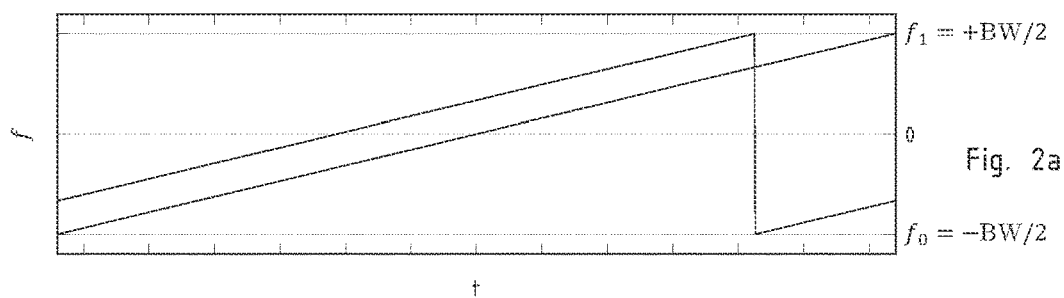
FIG. 2a plots the instantaneous frequency of a base chirp and of a modulated chirp according to one aspect of the invention. The phase of the same signals is represented in FIG. 2b, and FIG. 2c plots the real and of the complex component of the base chirp, in the time domain.
Figure 2B:
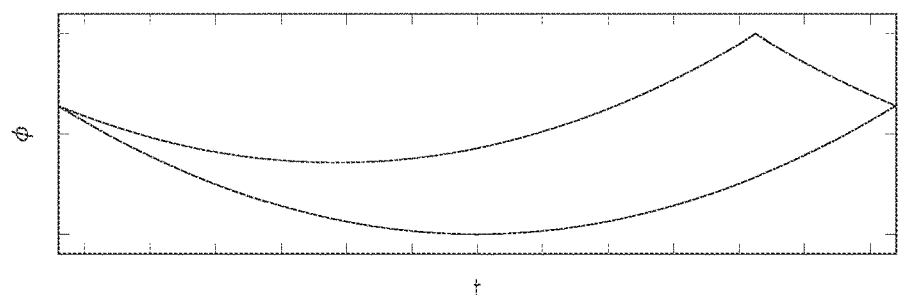

The chirps in the baseband signal can be described by the time profile f(t) of their instantaneous frequency or also by the function $\phi(t)$ defining the phase of the signal as a function of the time, as plotted in FIGS. 2a-2b. Importantly, the processor 180 is arranged to process and recognize chirps having a plurality of different profiles, each corresponding to a symbol in a predetermined modulation alphabet.

Figure 2C:
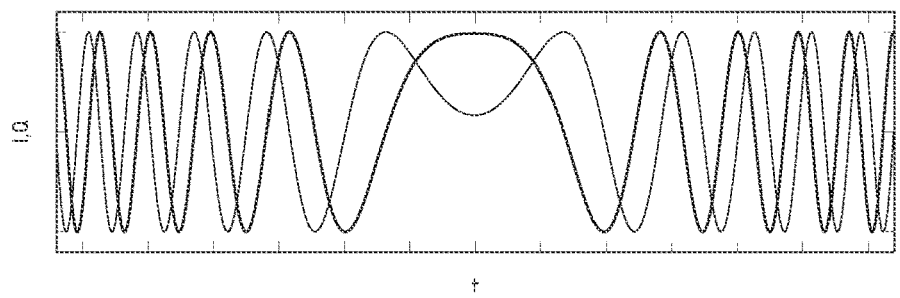

FIG. 2c is a plot of the real and imaginary component, I and Q, of the baseband signal corresponding to a base chirp, in the time domain.

The signal may include also conjugate chirps that is, chirps that are complex conjugate of the base unmodulated chirp. One can regard these as down-chirps, in which the frequency falls from a value of $f_0=-BW/2$ to $f_1=BW/2$.

According to an important feature of the invention, the received signal Rx can comprise base chirp (also called unmodulated chirps in the following) that have specific and predefined frequency profile, or one out of a set of possible modulated chirps, obtained from base chirps by time-shifting cyclically the base frequency profile. FIG. 2a illustrates, by way of example, possible frequency and phase profiles of a base chirp and of one modulated chirp between the time instant $t=t_0$ at the beginning of a chirp and the instant $t=t_1$ at the end of the chirp, while FIG. 2b shows the corresponding baseband signals in the domain of time. The horizontal scale corresponds for example to a symbol and, while the plots are drawn as continuous, they in fact represent a finite number of discrete samples, in a concrete implementation. As to the vertical scales, they are normalized to the intended bandwidth or to the corresponding phase span. The phase is represented in FIG. 2b as if it were a bounded variable, in order to better show its continuity, but it may in fact span across several revolutions in a concrete implementation.

We denote with N the length of the symbol, or equivalently the spreading factor. To allow easy reception using FFT, N is preferably chosen to be a power of two. The Nyquist sampling frequency if 1/BW, and the length of a symbol is N/BW. To fix the ideas, but without limiting the invention to these specific numeric values, one can imagine that, in a possible application, BW be 1 MHz, and N equal 1024, 512, or 256. The carrier frequency may be in the 2.45 GHz IMS band. In this embodiment, the modulation schema of the invention could occupy the same RF band as a Bluetooth® transceiver and, possibly, reuse or share the RF parts of a Bluetooth® transceiver. The invention is not limited to this frequency band, however.

Hence, a modulated symbol is a cyclic shift of the base symbol, of any number between 0 and N−1 where $N=2^{SF}$, SF being the spreading factor. A modulation value of 0 is equivalent to the absence of modulation. Since N is a power of two, each modulated chirp can therefore be regarded as a symbol that encodes $\log_2 N$ bits in its cyclic shift can code. It is sometimes advantageous to limit the symbol constellation to a reduced set, defined for the purpose of this disclosure as a proper subset of the possible symbols.

Thus, "cyclic shift value" may be used in the following to indicate the modulation in the time domain, and "modulation position", or "peak position" represents it in the frequency domain.

In the example depicted, the frequency of a base chirps increases linearly from an initial value $f_0=-BW/2$ to a final value $f_1=BW/2$, where BW stands for bandwidth spreading, but descending chirps or other chip profiles are also possible. Thus, the information is encoded in the form of chirps that have one out of a plurality of possible cyclic shifts with respect to a predetermined base chirp, each cyclic shift corresponding to a possible modulation symbol or, otherwise said, the processor 180 needs to process a signal that comprises a plurality of frequency chirps that are cyclically time-shifted replicas of a base chirp profile, and extract a message that is encoded in the succession of said time-shifts.

Figure 3:
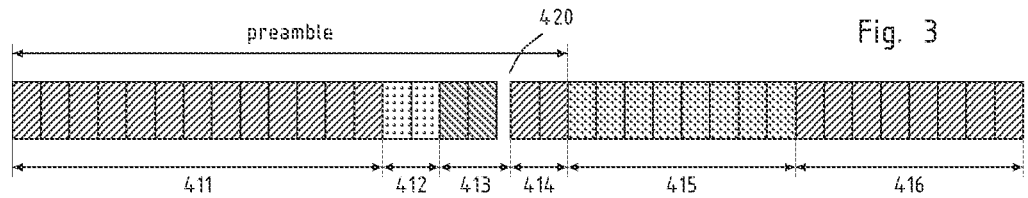
FIG. 3 represents schematically the structure of data frames exchanged between two devices in the frame of the present invention.

Preferably, the signal transmitted and received by the invention are organised in frames that include a preamble and a data section, suitably encoded. The preamble and the data section comprise a series of chirps modulated and/or unmodulated, that allows the receiver to time-align its time reference with that of the transmitter, retrieve an element of information, perform an action, or execute a command. In the frame of the invention, several structures are possible for the data frame, depending inter others, on the channel condition, transmitted data or command. FIG. 3 represents schematically, a frame structures that can be employed in various aspects of the present invention. The frame may include in the preamble a series of detect symbols 411, that allow the detection of an incoming signal in the receiver, different groups of synchronisation symbols 412, 413, 414, a header 415, and a payload 416 that includes the message intended for the destination node and may have variable length.

Demodulation

Preferably, the phase of the chirps is described by a continuous function $\phi(t)$, that has the same value at the beginning and at the end of a chirp: $\phi(t_0)=\phi(t_1)$. Thanks to this, the phase of the signal is continuous across symbol boundaries, a feature that will be referred to in the following as inter-symbol phase continuity. In the example shown in FIG. 2a, the function f(t) is symmetrical, and the signal has inter-symbol phase continuity. The structure of the signal described above allows the processor 180 in the receiver to align its time references with that of the transmitter, and the determination of the amount of cyclical shift imparted to each chirp.

The operation of evaluating a time shift of a received chirp with respect to a local time reference may be referred to in the following as "dechirping", and can be carried out advantageously by a de-spreading step that involves multiplying the received chirp by a complex conjugate of a locally-generated base chirp, and a demodulation step that consists in performing a FFT of the de-spread signal. Other manners of dechirping are however possible.

We denote with S the complex values of the baseband signal in the time domain, where k is a frame index, and j indicates the sample. The combined de-spreading and demodulation operations produce the complex signal X(n, k)= $\mathcal{F}(S_j^k \cdot \overline{b}_j)$, where $\overline{b}_j$ denotes the conjugate base chirp, and $\mathcal{F}$ is the Fourier transform. The position of the maximum of the FFT is indicative of the shift, and of the modulation value. A simple "hard" demodulator for LoRa signals can be realized by computing the function $h(k)=\mathrm{argmax}_n (|X(k,n)|)$.

Figure 4:
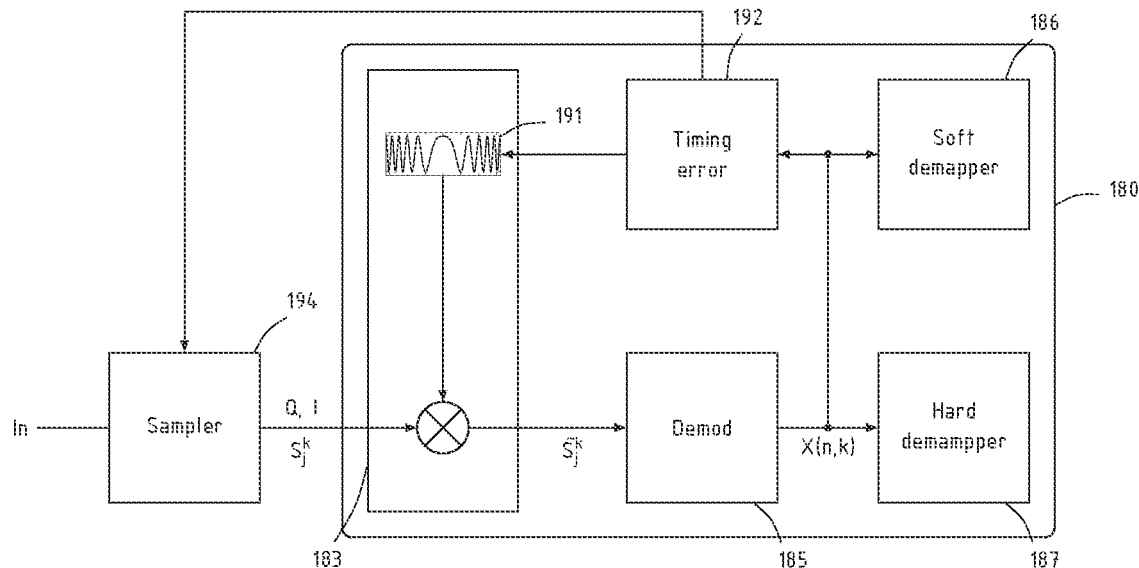
FIG. 4 shows a possible structure of a LoRa demodulator.

These operations of de-spreading and demodulating are implemented in a de-spreading unit 183, respectively a demodulating unit 185 in the baseband processor 180 as represented in FIG. 4. The baseband processor is preceded by a sampling unit 194 that generates the series of samples $S_j^k$ in any suitable way. It must be understood, however that these wordings can be interpreted functionally and do not necessarily imply physically distinct and independent hardware elements. The invention comprising also variants in which the de-spreading unit and/or the demodulating unit are realized partly or in full in software or utilize resources in common with other element of the system. FIG. 4 also shows a Hard demapper 187, a soft demapper or decoder 186, and a unit for computing a timing or tracking error 192. They implement the corresponding operations that will be disclosed in the following.

In the presented example, the frames have a preamble including a detect sequence 411 of base (i.e. un-modulated, or with cyclic shift equal to zero) symbols. The detect sequence 411 is used in the receiver to detect the beginning of the signal and, preferably, perform a first synchronisation of its time reference with the time reference in the transmitter. The groups of symbols 412, 413, and 414 are required by the LoRa protocol and are used for synchronization but are not necessarily part of the present invention. The preamble may be followed by a message header 415 that informs the receiver on the format of the following data, and a payload 416 that is defined by the application. By demodulating the detect sequence, the receiver can determine a shift amount and adapt the frequency and phase of its clock with those of the sender, thus allowing the decoding of the following data.

Figure 5:
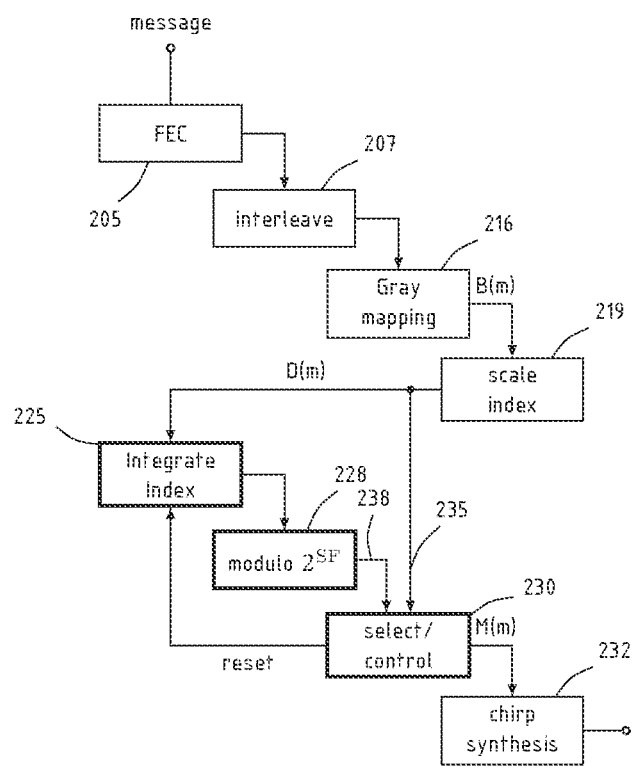
FIG. 5 illustrates a modulator with a differential encoding scheme according to an aspect of the invention.

Since LoRa modulation uses cyclic shifts of the same base waveform, demodulation errors are in most cases errors of ±1 or, in rare cases, ±2 units of shift. Preferably, the modulator of the invention includes a differential encoding unit arranged for generating a series of shift, in which each possible value of the input symbol corresponds to a predetermined change in the series of differential-encoded symbols. FIG. 5 illustrates a possible realization of the corresponding modulation chain: the digital stream that must be transmitted is processed by the forward error correction unit 205 that insert suitable error correction codes, then by the interleaver 207 and the Gray mapper 216. Block 219 transforms Gray encoded values into the desired modulation alphabet, also called modulation set. The alphabet may be complete or reduced.

Figures 6, 7, 8:
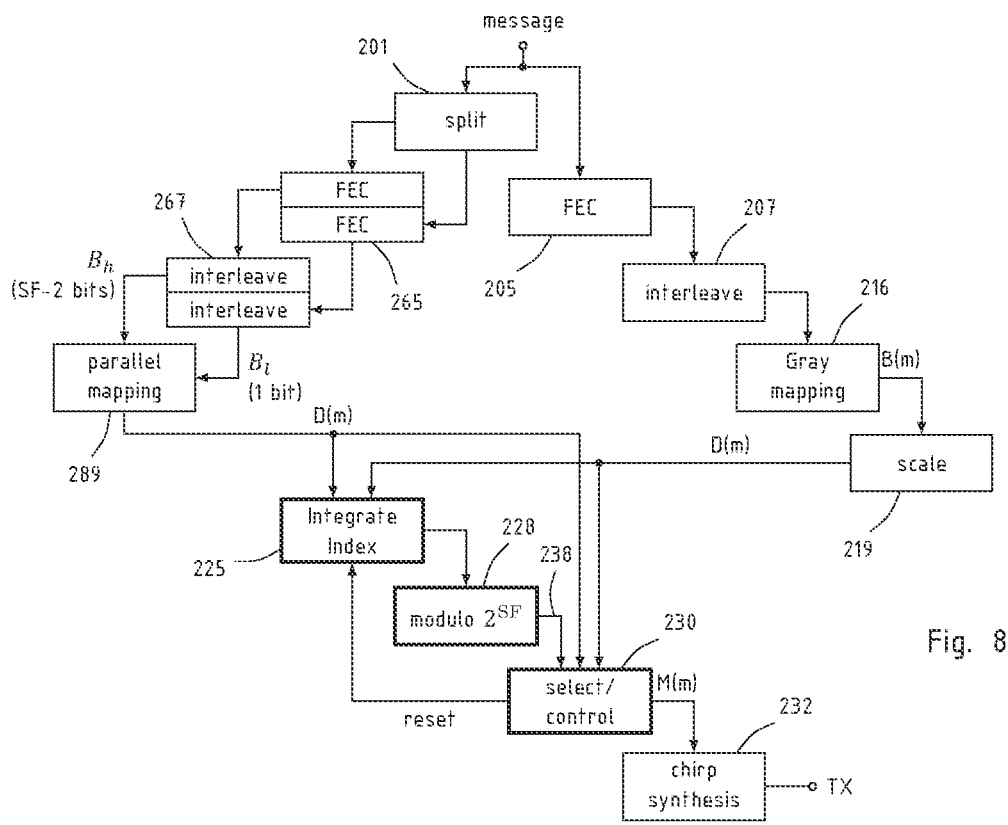
FIGS. 6 and 7 show two possible reduced modulation sets.
FIG. 8 illustrates a modulator with a differential encoding scheme.

The complete modulation set includes as many symbols as here are possible cyclical shift from 0 to $2^{SF}-1$. The error rate in noisy condition can be reduced, albeit with a bandwidth reduction, choosing a reduced modulation set that does not include all the possible symbols. FIG. 6 illustrates a possible way of choosing a reduced modulation set that includes only the symbols of the form K·p in the range 0, ... $2^{SF}-1$, where p denotes an integer, and K a multiplication factor, for example K=4. K should be a divisor of the symbol length; if the symbol length is a power of two, so should be K. This ensures that after the integration and modulo operation that are done in differential coding, the modulation set is unchanged.

Blocks 225 and 228 symbolise the operations involved in the differential coding. The former 225 is a numerical integrator that accumulates the cyclical shifts generated by unit 219, and block 228 implements a modulo operation that generates a differential code 238 in 0, ... $2^{SF}-1$.

The select/control block 230 allows switching between normal and differential code at will, also within a frame. Preferably, the preambles are transmitted with non-differential modulations, while headers and payloads may be differentially encoded or not. In a convenient arrangement, the header is not differentially encoded and signal whether the payload is differentially encoded or not. In this way all receivers, whether they can receive differential modulation or not, can decode and understand the header. In this arrangement, the receiver needs not know in advance which modulation format is used. The selection block 230 sends to the chirp synthesizer 232 either the normal cyclical shifts 235, or the differentially encoded shifts 238, according to whether normal or differential modulation is desired. It resets also the integrator 225 when necessary, for example at transitions between normal and differential code.

At reception, differential modulation is usually associate with a loss of about 3 dB, because the first demodulation operation is usually a difference between two symbols that have independent noise contributions. This state of affair can be mitigated by a special soft decoder.

The soft output differential demodulator considers pairs of potential modulated values between the current symbol and the previous symbol. For each bit, independently of other bits, the pair with the maximum summed amplitude which corresponds to a '0' value is compared to the pair with the maximum summed amplitude corresponding to a '1' value. To reduce complexity to practical levels, only some modulation values are compared for each symbol, which correspond to the modulation values showing the highest amplitude after the FFT.

We introduce the following notation:

$n_{max}$ stands for the number of potential modulated values considered per each symbol m is the index of current symbol, and m−1 that of the previous one $\{A_{m,l}\}$ with l ranging from 0 to $n_{max}-1$ stands for the list of maximum magnitudes after FFT for symbol m. We assume further that they are ordered as in $A_{m,0} > A_{m,1} > A_{m,2} > A_m$ ...

$(M_{m,i})$ with i ranging from 0 to $n_{max}-1$ are the modulation values corresponding to the set $\{A_{m,1}\}$. At FFT output, $\{M_{m,i}\}$ are the indexes and $\{A_{m,1}\}$ the magnitudes.

HD(x) is the demapping function (HD standing for hard decode) This is the inverse function of Gray mapping followed by index scaling. The output of HD(x) is a set of bits and we will denote the output of bit j with $HD_j(x)$. The index j ranges from 0 to $\log_2$(modulation set)−1

At symbol m, for each bit j, we compute:

$S_{0,j}$: the set of (i, k) such that $HD_j(M_{m,k}-M_{m-1,i})=0$
(N.B.: the HD function includes a $\mod(2^{SF})$ operation to cover the cases where the modulation difference is negative)

$S_{1,j}$: the set of (i, k) such that $HD_j(M_{m,k}-M_{m-1,i})=1$ $S_{0,j}$ is the set of (i, k) such that the transmission of modulation value $M_{m-1,i}$ at symbol (m−1), and of modulation value $M_{m,k}$ at symbol (k) implies that bit j has value 0 for symbol m. Conversely, $S_{1,j}$ is the set such that the bit j has, for the same transmission, value 1. Any pair (i, k) belongs either to $S_{0,j}$ or to $S_{1,j}$.

Then we compute:

$$AA_{0,j}=\max_{(l,k)\in S_{0,j}}(A_{m-1,l}+A_{m,k})$$

$$AA_{1,j}=\max_{(l,k)\in S_{1,j}}(A_{m-1,l}+A_{m,k})$$

Finally, the soft demodulation output for bit j at symbol m is computed as $SD_j=AA_{1,j}-AA_{0,j}$.

The soft differential demodulation method disclosed considers for each symbol m a limited number of possible modulation values, and, for each bit, consider the possible pair of modulation values in the current symbol and in the previous one. The method groups possible pair of modulation values in two sets according to the resulting value of that bit. The soft demodulated value is computed as the difference of the maximum summed magnitudes in the two sets. The inventors have found that such a soft demodulation method gives, for typical noise levels and equivalent error rates, a noise increase of 1 dB compared to non-differential soft demodulation. The number of modulation values considered remains reasonably low, 8 being a typical figure.

In combination or in alternative to the differential modulation and demodulation methods disclosed above, the sensitivity can be increased, without augmenting the symbol length, by repeating symbols. Close to the limit sensitivity, the limit of the system is currently determined by detection, and synchronization tracking. The former limitation may be addressed by lengthening the preamble. Synchronization produces errors in the received message that cannot be recovered by FEC, however.

The modulator of the invention may insert repetitions of the symbols in the transmitted frame to permit detection and correction of errors in the receiver. The repetition can be identical or, preferably, a repetition of a shifted symbol, by a cyclic shift that is known, or can be computed, by the receiver. LoRa modulation alphabet uses a regular distribution of cyclic shifts between 0 and $2^{SF}-1$. Some modulation values, for example those close to one half of the symbol length, are weaker than other for what resistance to noise and tracking are concerned. A shift introduced in symbol repetition may balance the distribution of these weaker values. For example, if the repetition level is 2, that is each symbol is transmitted twice, one transmission may be shifted systematically by symbol_length/2. If the repetition level is 4, the shifts may be {0, symbol_length/4, symbol_length/2, symbol_length/4}, and so on.

Gray encoding is useful in detecting and correcting tracking errors. due to the use of cyclic shifts in LoRa, the most common errors are those where a symbol is received and demodulated to a value that is shifted of ±1 from the original one. After Gray demapping, such errors translate into an arbitrary bit error.

Differential modulation has a similar purpose as the Gray encoding, although it handles the errors differently: stable errors (a long constant error in timing or frequency at the receiver's side) are not repeated after the first occurrence; transition symbols—where the error first arises or ends—have, with Gray encoding, a random bit error. In fast-varying channels, this leads to high error rates.

A reduced modulation set can help in these demanding cases, albeit at the cost of bandwidth. Gray encoding could be unnecessary.

FIG. 6 illustrates a simple schema of reduction of the modulation set in which one symbol out of four is used. The example relates to SF6 modulation, such that the possible symbol range from 0 to 63, or 1111 in binary. Only the symbols of the form 4·p are used, while the others that are never generated, are indicated by "N/A". FIG. 6 shows only a quarter of the possible 64 modulation values.

FIG. 7 illustrates another schema of reduction of the modulation set that combines advantageously with differential modulation where errors are not an integer number of samples or, in the Fourier domain, an integer number of FFT bins. The new mapping function transmits an additional bit (or an additional bit field) per symbol than the mapping function of FIG. 6. The additional bit is denoted by $B_l$, while the remaining SF-2 bits are denoted by $B_h$. Only half of the symbols are used, in groups of two, and the remaining half is never used, but other schemes are possible. Compared to the 4·p reduction scheme, there is an effective increase of one bit.

Since differential modulation is used, a constant offset in demodulation will not affect the $B_h$ bits, nor the $B_l$ bit. The reduction scheme is arranged such that the $B_h$ field of bits is a "high reliability" field that can be decoded reliably and correctly also when there is an error of ±1 in the perceived cyclical shift, for example because the reduction scheme is organised in groups that encode the same value of $B_h$. The $B_l$ bit is a "low reliability" field and is affected by such transitions.

FIG. 8 illustrates, in schematic form, a possible realization of a modulation chain implementing the alternative mapping described above. The right branch comprising blocks 205, 207, 216, 219 corresponds to the processor disclosed above in relation to FIG. 5, and its output is still available. The right branch includes a splitting operation 201, in which the message is split into two separate stream, one corresponding to (SF-2) bits and one to one bit. The data have preferably processed independently by insertion of error correction codes (block 265) and interleaving (267). Advantageously, the forward error correction schemes for the $B_h$ branch and those for the $B_l$ branch are different and optimized in function of the different coding rates in the two branches. Block 289 symbolises the combination of $B_h$ and $B_l$ before the integration 225.

The control unit 230 has therefore the choice between three possible data streams to transmit: the conventional data D(m) without differential encoding or parallel mapping, the differentially encoded data, and the data encoded in a reduced set with an additional $B_l$ bit, differentially encoded.

REFERENCE SYMBOLS

100 RF stage
102 RF switch
110 mixer
120 power amplifier
129 local oscillator
150 modulator
152 data for transmission
154 buffer, amplifier
160 low noise amplifier
170 mixer
180 demodulator
182 received data
183 despreading unit
185 demodulator
186 soft demapper
187 hard demapper
190 PLL
191 replica chirp
192 timing error
194 sampler
200 baseband processor
201 split
205 error correction
207 interleaver
216 Gray mapping
219 scaling
225 integrator
228 modulo wrapping
230 select/control
232 chirp synthesis
235 non-differential-encoded shifts
238 differential-encoded shifts
265 error correction
267 interleaver
189 parallel mapping 411 detect sequence
412 frame synchronisation symbols
413 frequency synchronisation symbols
414 fine synchronisation symbols
415 header
416 payload
420 silence

The invention claimed is:

1. A low-power long-range radio device having a transmitting section, comprising:
   an encoder configured to encode a digital message into a series of first symbols, each first symbol having a plurality of bits,
   a differential coding unit configured to receive as input the series of first symbols generated by the encoder and generating a series of second symbols as output, whereby each possible value of the first symbol corresponds to a predetermined change in the series of second symbols,
   a modulator configured to receive the second symbols, arranged for synthesizing a series of modulated chirps whose instantaneous frequency vary according to one of a plurality of functions that are cyclical shift of one base chirp function, wherein the cyclical shift of a chirp represents the value of a corresponding second symbol.

2. The radio device of claim 1, in which the digital message is processed in the encoder successively by an interleaver, a Gray encoder, and by the differential coding unit.

3. The device of claim 1, wherein the modulation set is reduced to a proper subset of possible symbols.

4. The device of claim 3, in which the reduced modulation set includes a main field of bits, and an additional bit or field of bits ($B_l$), wherein the reduction scheme is such that the main field of bits is robust against errors of ±1 in the cyclical shift.

5. The device of claim 4, wherein the main field and the additional bit or field are processed in parallel.

6. The radio device of claim 1, in which the differential coding unit can be selectively disabled such that it copies the series of first symbols into the second symbols, comprising a frame builder unit arranged for organizing the symbols in frames, wherein part of each frame are not processed by the differential coding unit.

7. The radio device of claim 6, wherein the frame has a preamble section for detection and synchronization and a header section for format signalisation that are not processed by the differential coding unit.

8. The radio device of claim 1 having a receiving section comprising a de-chirping unit configured to acquire the cyclical shift of received chirp signals followed by a soft differential decoder unit configured to decode symbols of a message transmitted by another identical or compatible radio device, whereby the decoded symbols have a plurality of soft bits that can assume values other than zero and one.

9. The radio device of claim 1, including a symbol repetition unit configured to replace an input symbol with a predetermined number of symbols derived from the input symbol by a predetermined succession of cyclical shifts, which can include the zero shift.

10. A low-power long-range radio device having a transmitting section, comprising:
    an encoder configured to encode a digital message into symbols having a plurality of bits;
    a modulator configured to receive the symbols, arranged for synthesizing a series of modulated chirps whose instantaneous frequency vary according to one of a plurality of functions that are cyclical shift of one base chirp function, wherein the cyclical shift of a chirp represents the value of a corresponding symbol, including
    a symbol repetition unit configured to replace an input symbol with a predetermined number of symbols derived from the input symbol by a predetermined succession of cyclical shifts, which can include the zero shift.

11. A method of transmitting by radio a digital message, comprising:
    encoding the digital message into a series of first symbols, each first symbol having a plurality of bits,
    generating a series of second symbols from the series of first symbols, whereby each possible value of a first symbol corresponds to a predetermined change in a corresponding second symbol,
    synthesizing a series of modulated chirps whose instantaneous frequency vary according to one of a plurality of functions that are cyclical shift of one base chirp function, wherein the cyclical shift of a chirp represents the value of a corresponding second symbol,
    transmitting a radio signal carrying the series of modulated chirps.

12. The method of claim 11, wherein the step of generating a series of second symbols comprises organizing the symbols in frames, each frame comprises second symbols that are generated from the series of first symbols such that each possible value of a first symbol corresponds to a predetermined change in a corresponding second symbol and second symbols that are unprocessed copies of the corresponding first symbols.

* * * * *